(12) United States Patent
Suzuki

(10) Patent No.: US 7,499,443 B2
(45) Date of Patent: Mar. 3, 2009

(54) WIRELESS ADHOC COMMUNICATION SYSTEM, TERMINAL, AUTHENTICATION METHOD FOR USE IN TERMINAL, ENCRYPTION METHOD, TERMINAL MANAGEMENT METHOD, AND PROGRAM FOR ENABLING TERMINAL TO PERFORM THOSE METHODS

(75) Inventor: Hideyuki Suzuki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/567,067

(22) Filed: Dec. 5, 2006

(65) Prior Publication Data
US 2007/0101142 A1    May 3, 2007

Related U.S. Application Data

(62) Division of application No. 10/767,371, filed on Jan. 30, 2004.

(30) Foreign Application Priority Data
Feb. 3, 2003  (JP)  ............................. 2003-026545

(51) Int. Cl.
H04M 7/00 (2006.01)
(52) U.S. Cl. ........................ 370/349; 713/160; 713/161; 713/168; 455/411; 380/270; 370/342
(58) Field of Classification Search ................. 370/349, 370/392; 713/160, 161, 168, 170; 380/270; 455/411
See application file for complete search history.

(56) References Cited

U.S. PATENT DOCUMENTS 6,185,680 B1 *  2/2001  Shimbo et al. .............. 713/160

(Continued)

FOREIGN PATENT DOCUMENTS

JP  5-75612  3/1993

(Continued)

OTHER PUBLICATIONS

IEEE Computer Society, ANSI/IEEE Std. 802.11, 1999 Edition, Part 11: Wireless LAN Medium Access Control (MAC) and Physical Layer (PHY) Specifications, section 5.*

(Continued)

*Primary Examiner*—Lester Kincaid
*Assistant Examiner*—Charles Shedrick
(74) *Attorney, Agent, or Firm*—Oblon, Spivak, McClelland, Maier & Neustadt, P.C.

(57) ABSTRACT

Frame transmission source authentication is performed among terminals involved in delivery in a wireless adhoc communication system. A first terminal generates a keyed hashed value by using an authentication header key determined with respect to a second terminal, and gives it to an authentication header of a frame. The second terminal generates a keyed hashed value by using the authentication header key determined with respect to the first terminal, and compares it with the authentication header given to the frame. If the keyed hashed value generated at the second terminal matches the authentication header, it is confirmed that the frame has been transmitted from the first authenticated valid terminal. The first terminal encrypts a payload part by using a unicast encryption key determined with respect to a third terminal. This encrypted payload part can be decrypted only by the third terminal having the unicast encryption key.

3 Claims, 15 Drawing Sheets

U.S. PATENT DOCUMENTS

| | | |
|---|---|---|
| 6,229,806 B1 | 5/2001 | Lockhart et al. |
| 6,847,620 B1 | 1/2005 | Meier |
| 6,912,657 B2 | 6/2005 | Gehrmann |
| 2002/0124169 A1* | 9/2002 | Agrawal et al. ............. 713/168 |
| 2002/0129236 A1 | 9/2002 | Nuutinen |
| 2002/0196764 A1 | 12/2002 | Shimizu |
| 2003/0118189 A1 | 6/2003 | Ibi et al. |
| 2003/0152041 A1* | 8/2003 | Herrmann et al. ........... 370/310 |
| 2004/0022391 A1 | 2/2004 | O'Brien |
| 2004/0049586 A1 | 3/2004 | Ocepek et al. |

FOREIGN PATENT DOCUMENTS

| | | |
|---|---|---|
| JP | 10-257064 | 9/1998 |
| JP | 11-239176 | 8/1999 |
| JP | 2001-128231 | 5/2001 |
| JP | 2001-285345 | 10/2001 |
| JP | 2002-26899 | 1/2002 |
| JP | 2004-72565 | 3/2004 |
| JP | 2004-254271 | 9/2004 |
| JP | 2004-260803 | 9/2004 |
| WO | WO 03/101132 A1 | 12/2003 |

OTHER PUBLICATIONS

Baltatu et al., IP Security, May 29-Jun. 2, 2000, NATO Workshop on Advanced Security Technologies in Networking, Dip. Automatica e Informatica Politenico di Torin, pp. 1-10.*

* cited by examiner

FIG. 6

| TERMINAL IDENTIFIER /671 | UNICAST ENCRYPTION KEY /672 | AUTHENTICATION HEADER KEY /673 |
|---|---|---|
| TERMINAL B | UK_AB | AHK_AB |
| TERMINAL C | UK_AC | AHK_AC |
| TERMINAL D | UK_AD | AHK_AD |
| ⋮ | ⋮ | ⋮ |

FIG. 7

| END-POINT TERMINAL IDENTIFIER ~681 | TRANSFER DESTINATION TERMINAL IDENTIFIER ~682 | EFFECTIVE TIME ~683 |
|---|---|---|
| TERMINAL B | TERMINAL B | 1:30 |
| TERMINAL C | TERMINAL B | 0:50 |
| TERMINAL D | TERMINAL B | 0:30 |
| ⋮ | ⋮ | ⋮ |

| 691 NEIGHBORING TERMINAL IDENTIFIER | 692 EFFECTIVE TIME |
|---|---|
| TERMINAL A | 1:30 |
| TERMINAL C | 0:50 |
| | |

WIRELESS ADHOC COMMUNICATION SYSTEM, TERMINAL, AUTHENTICATION METHOD FOR USE IN TERMINAL, ENCRYPTION METHOD, TERMINAL MANAGEMENT METHOD, AND PROGRAM FOR ENABLING TERMINAL TO PERFORM THOSE METHODS

CROSS-REFERENCE TO RELATED APPLICATIONS

This application is a Divisional of U.S. patent application Ser. No. 10/767,371, filed Jan. 30, 2004, and claims priority to Japanese Patent Application No. 2003-026545, filed Feb. 3, 2003. The contents of U.S. patent application Ser. No. 10/767,371 are incorporated herein by reference in their entirety.

BACKGROUND OF THE INVENTION

1. Field of the Invention

The present invention relates to a wireless adhoc communication system. More particularly, the present invention relates to a wireless adhoc communication system for performing communication while confirming among devices that a frame is transmitted from an authenticated terminal, a terminal for use in a system, an authentication method, an encryption method, a terminal management method for use in the system and the terminal, and a program for enabling a computer (terminal) to perform those methods.

2. Description of the Related Art

As electronic devices have become smaller, have come to have higher performance, and have become easy to use while being carried, there has been a demand for an environment in which a terminal is connected to a network in situ where necessary so as to make communication possible. In one of the environments, the development of a network which is temporarily constructed as necessary, that is, a wireless adhoc network technology, has been in progress. In this wireless adhoc network, terminals (for example, PDAs (Personal Digital Assistants), and cellular phones) are interconnected with one another in an autonomously distributed manner without providing a specific access point.

In a conventional wireless LAN (Local Area Network) environment, since a specific access point is provided and wireless communication is performed between that access point and the terminal, encryption of frames in a wireless zone thereof will suffice. For example, in WEP (Wired Equivalent Privacy) in the encryption specification of wireless LAN, frames are encrypted in advance using an encryption key, and when the frames are decrypted at the access point, by performing CRC (Cyclic Redundancy Check), frames from a terminal which is not authenticated is discarded (for example, refer to Japanese Unexamined Patent Application Publication No. 2001-111544 (FIG. 3)).

Although, in the above-described wireless LAN, the wireless zone is limited to the section between the access point and the terminal, in the wireless adhoc communication system, the entirety of the network topology is formed by a wireless medium. Therefore, since, in the wireless adhoc communication system, there occurs a case in which frames are delivered by making a plurality of wireless links hop, there is a risk that, as a result of an encryption process and a decryption process being repeated for each wireless link, a load is incurred at each terminal, wasting the calculation resources. Furthermore, since the delivery of frames from a terminal which is not authenticated among a plurality of devices causes an originally unwanted communication to occur, there is a risk that the wireless resources are wasted.

SUMMARY OF THE INVENTION

Accordingly, an object of the present invention is to perform frame transmission source authentication among devices involved in delivery in the wireless adhoc communication system. In particular, the present invention is useful in a wireless network in which all the wireless terminals which form the network transmit management information (for example, a beacon).

To achieve the above-mentioned object, in one aspect, the present invention provides a wireless adhoc communication system formed of a plurality of terminals, the wireless adhoc communication system including: a first terminal for transmitting a frame in which an authentication header is given; and a second terminal for receiving the frame and confirming that the authentication header is valid, wherein the first terminal generates the authentication header by using an authentication header key with respect to the second terminal, and the second terminal confirms that the authentication header is valid by using the authentication header key. As a result, an operational effect is obtained such that it can be confirmed at the second terminal that the frame is given a valid authentication header generated using an authentication header key at the first terminal.

In another aspect, the present invention provides a wireless adhoc communication system formed of a plurality of terminals, the wireless adhoc communication system including: a first terminal for encrypting the payload of a first frame and transmitting the first frame in which a first authentication header is given; a second terminal for receiving the first frame and transmitting a second frame containing the encrypted payload, in which a second authentication header is given when it is confirmed that the first authentication header is valid; and a third terminal for receiving the second frame and decrypting the encrypted payload when it is confirmed that the second authentication header is valid, wherein the first terminal encrypts the payload by using an encryption key with respect to the third terminal, and generates the first authentication header by using the first authentication header with respect to the second terminal, the second terminal confirms that the first authentication header is valid by using the first authentication header and generates the second authentication header by using the second authentication header with respect to the third terminal, and the third terminal confirms that the second authentication header is valid by using the second authentication header key and decrypts the payload by using the encryption key with respect to the first terminal. As a result, an operational effect is obtained such that, while frame transmission source authentication is performed using the authentication header between the first terminal and the second terminal and between the second terminal and the third terminal, by encrypting the payload using the encryption key possessed by only the first terminal and the third terminal, the secrecy of the payload can be ensured for the second intermediate terminal.

In another aspect, the present invention provides a terminal including: a key management list table having at least one key management list in which authentication header keys with respect to other terminals are held in such a manner as to correspond to the terminal identifiers of the other terminals; means for searching the key management list for the key management list containing the transmission terminal identifier of a received frame in order to extract the corresponding authentication header key; and means for confirming whether or not the authentication header of the frame is valid by using the extracted authentication header key. As a result, an operational effect is obtained such that the reception terminal is made to confirm that the authentication header given to the received frame is generated by a valid transmission terminal.

In one form of the terminal of the present invention, the terminal may further include: a path table having at least one path list for holding a transfer destination terminal identifier for causing a frame to arrive at another terminal in such a manner as to correspond to the terminal identifier of the other terminal; and means for searching the path table for the path list containing an end-point terminal identifier and transmitting the frame to the transfer destination terminal identifier when the authentication header is valid and the end-point terminal identifier of the frame is not the terminal identifier of the other terminal and for discarding the frame when the authentication header is not valid. As a result, an operational effect is obtained such that, when the fact that the authentication header given to the received frame is generated by a valid transmission terminal is confirmed, the frame is transferred to the next transfer destination terminal, and if the authentication header is not valid, the frame is discarded.

In another aspect, the present invention provides a terminal including: a key management list table having at least one key management list for holding an authentication header key and a unicast encryption key with respect to another terminal in such a manner as to correspond to the terminal identifier of the other terminal; means for searching the key management list table for the key management list containing the transmission terminal identifier of a received frame in order to extract the corresponding authentication header key; means for confirming whether or not the authentication header of the frame is valid by using the extracted authentication header key; means for searching the key management list table for the key management list containing a start-point terminal identifier of the frame in order to extract the corresponding unicast encryption key when the authentication header is valid and the end-point terminal identifier of the frame is the terminal identifier of the other terminal; and means for decrypting the payload of the frame by using the extracted unicast encryption key. As a result, an operational effect is obtained such that, by encrypting the payload using the unicast encryption key determined between the start-point terminal and the end-point terminal, the secrecy of the payload can be ensured for the intermediate terminal.

In another aspect, the present invention provides a terminal including: a key management list table having at least one key management list for holding an authentication header key with respect to another terminal in such a manner as to correspond to the terminal identifier of the other terminal; means for searching the key management list table for the key management list containing the reception terminal identifier of a frame to be transmitted in order to generate an authentication header by using the corresponding authentication header key and for giving the authentication header to the frame; and means for transmitting the frame. As a result, an operational effect is obtained such that the frame reception terminal is made to confirm that the frame is given an authentication header generated using an authentication header key.

In another aspect, the present invention provides a terminal including: a key management list table having at least one key management list for holding authentication header keys and unicast encryption keys with respect to other terminals in such a manner as to correspond to the terminal identifiers of the other terminals; means for searching the key management list table for the key management list containing the reception terminal identifier of a frame to be transmitted in order to generate an authentication header by using the corresponding authentication header key and for giving the authentication header to the frame; means for searching the key management list table for the key management list containing the end-point terminal identifier of the frame and for encrypting the payload of the frame by using the corresponding unicast encryption key; and means for transmitting the frame. As a result, an operational effect is obtained such that, by encrypting the payload using the unicast encryption key determined between the start-point terminal and the end-point terminal, the secrecy of the payload can be ensured for the intermediate terminal.

In another aspect, the present invention provides a terminal including: a neighboring terminal list table for holding the terminal identifier of another terminal with which direct communication is possible among the terminals which form a network; a key management list table having at least one key management list for holding an authentication header key with respect to another terminal in such a manner as to correspond to the terminal identifier of the other terminal which forms the network; and means for, when a leaving from the network occurs at the terminals whose terminal identifiers are held in the neighboring terminal list table, deleting from the key management list table the key management list containing the terminal identifier of the terminal that has left the network. As a result, an operational effect is obtained such that, by deleting from the key management list table information regarding the neighboring terminal that has left the network, the neighboring terminal is placed in a non-authenticated state.

In one form of the terminal of the present invention, the terminal may further include means for transmitting a terminal leaving message for informing the terminal identifier of the terminal that has left the network to the other terminals which form the network in a case where the terminal whose terminal identifier is held in the neighboring terminal list table leaves the network. As a result, an operational effect is obtained such that the fact that the neighboring terminal that has left the network is informed to the other terminals.

In another aspect, the present invention provides a terminal including: a key management list table having at least one key management list for holding authentication header keys with respect to other terminals in such a manner as to correspond to the terminal identifiers of the other terminals which form a network; and means for, when a terminal leaving message informing the terminal identifier of the terminal that has left the network is received, deleting from the key management list table the key management list containing the terminal identifier of the terminal that has left the network. As a result, an operational effect is obtained such that, by deleting information regarding the terminal that has left the network from the key management list table, the terminal is placed in a non-authenticated state.

In another aspect, the present invention provides an authentication method for use in a terminal having a key management list table having at least one key management list for holding authentication header keys with respect to other terminals in such a manner as to correspond to the terminal identifiers of the other terminals, the authentication method including the steps of: searching the key management list table for the key management list containing the transmission terminal identifier of a received frame in order to extract the authentication header key; and confirming whether or not the authentication header of the frame is valid by using the extracted authentication header key. As a result, an operational effect is obtained such that the first terminal is made to confirm that the authentication header given to the received frame is generated by a valid transmission terminal.

In another aspect, the present invention provides an authentication method for use in a terminal having a key management list table having at least one key management list for holding authentication header keys with respect to other terminals in such a manner as to correspond to the terminal identifiers of the other terminals, the authentication method including the steps of: searching the key management list table for the key management list containing the transmission terminal identifier of a received frame in order to extract the authentication header key; generating a keyed hashed value, in which the extracted authentication header key is hashed together with a predetermined area of the frame; and confirming whether or not the authentication header is valid by comparing the keyed hashed value with the authentication header of the frame. As a result, an operational effect is obtained such that the reception terminal is made to confirm the validity of the authentication header given to the received frame on the basis of the keyed hash function, whose strength is ensured.

In another aspect, the present invention provides an encryption method for use in a terminal having a key management list table having at least one key management list for holding authentication header keys and unicast encryption keys with respect to other terminals in such a manner as to correspond to the terminal identifiers of the other terminals, the encryption method including the steps of: searching the key management list table for the key management list containing the transmission terminal identifier of a received frame in order to extract the authentication header key; confirming whether or not the authentication header of the frame is valid by using the extracted authentication header key; searching the key management list table for the key management list containing the start-point terminal identifier of the frame when the authentication header is valid and the end-point terminal identifier of the frame is the terminal identifier of the corresponding terminal in order to extract the corresponding unicast encryption key; and decrypting the payload of the frame by using the extracted unicast encryption key. As a result, an operational effect is obtained such that, by encrypting the payload using the unicast encryption key determined between the start-point terminal and the end-point terminal, the secrecy of the payload is ensured for the intermediate terminal.

In another aspect, the present invention provides an encryption method for use in a terminal having a key management list table having at least one key management list for holding authentication header keys with respect to other terminals in such a manner as to correspond to the terminal identifiers of the other terminals, the encryption method including the steps of: searching the key management list table for the key management list containing the reception terminal identifier of a frame to be transmitted in order to extract the corresponding authentication header key; generating a keyed hashed value, in which the extracted authentication header key is hashed together with a predetermined area of the frame, and giving the keyed hashed value as an authentication header to the frame; and transmitting the frame. As a result, an operational effect is obtained such that the reception terminal is made to confirm that a valid authentication header is given on the basis of the keyed hash function, whose strength is ensured.

In another aspect, the present invention provides a terminal management method for use in a terminal having a neighboring terminal list table for holding terminal identifiers of other terminals with which direct communication is possible among the terminals which form a network and a key management list table having at least one key management list for holding an authentication header key with respect to another terminal in such a manner as to correspond to the terminal identifier of the other terminal which forms the network, the terminal management method including the steps of: detecting a leaving from the network at the terminals whose terminal identifiers are held in the neighboring terminal list table; deleting from the key management list table the key management list containing the terminal identifier of the terminal that has left the network; and transmitting a terminal leaving message informing the terminal identifier of the terminal that has left the network to the other terminals which form the network. As a result, an operational effect is obtained such that, by deleting information regarding the neighboring terminal that has left the network from the key management list table, the neighboring terminal is placed in a non-authenticated state, and the fact that the neighboring terminal has left the network is informed to the other terminals.

In another aspect, the present invention provides a terminal management method for use in a terminal having at least one key management list for holding authentication headers with respect to other terminals in such a manner as to correspond to the terminal identifiers of the terminals which form the network, the terminal management method including the steps of: receiving a terminal leaving message informing the terminal identifier of a terminal that has left the network; and deleting from the key management list table the key management list containing the terminal identifier of the terminal that has left the network. As a result, an operational effect is obtained such that, by deleting information regarding the neighboring terminal that has left the network from the key management list table, the neighboring terminal is placed in a non-authenticated state.

As is clear from the foregoing description, according to the present invention, in the wireless adhoc communication system, the advantage that frame transmission source authentication can be performed among terminals involved in delivery can be obtained.

BRIEF DESCRIPTION OF THE DRAWINGS

FIG. 6 shows an example of the structure of a key management list table 670 in the embodiment of the present invention;

FIG. 7 shows an example of the structure of a path table 680 in the embodiment of the present invention;

FIG. 8 shows an example of the structure of a neighboring terminal list table 690 in the embodiment of the present invention;

DESCRIPTION OF THE PREFERRED EMBODIMENTS

Embodiments of the present invention will now be described below with reference to the drawings.

Figure 1:
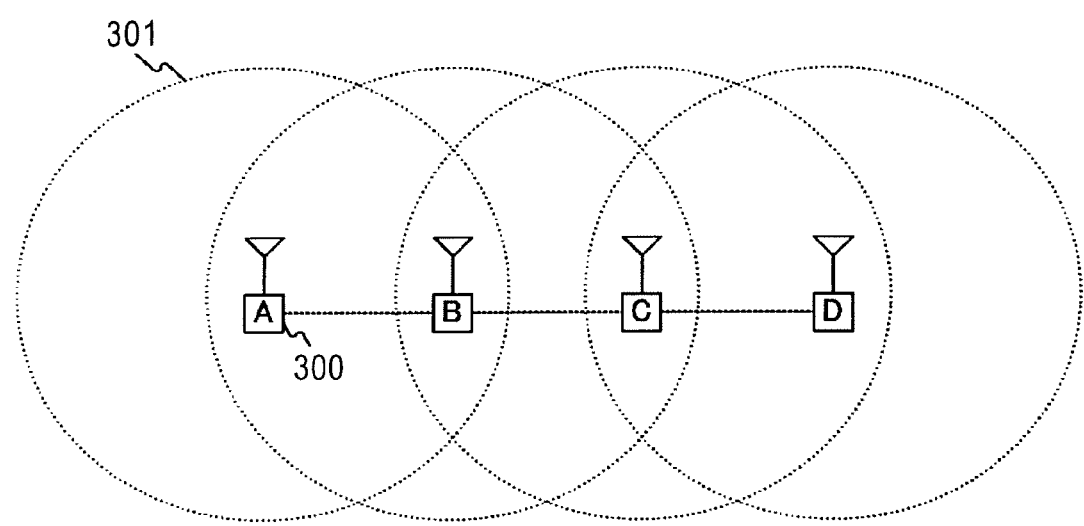
FIG. 1 shows an example of the network configuration of a wireless adhoc communication system in an embodiment of the present invention.

FIG. 1 shows an example of the network configuration of a wireless adhoc communication system in an embodiment of the present invention. In this example, four terminals, that is, a terminal A, a terminal B, a terminal C, and a terminal D, form the network of the wireless adhoc communication system. A communication range 301 in which radio waves from the terminal A (300) reach is indicated by the dotted line with the terminal A being the center. The communication range of the other terminals is indicated similarly. In the example of FIG. 1, it is shown that the terminal A can communicate with the terminal B, the terminal B can communicate with the terminal A and the terminal C, the terminal C can communicate with the terminal B and the terminal D, and the terminal D can communicate with the terminal C. Therefore, for example, the terminal A cannot perform communication directly with the terminal C or the terminal D. In order to perform communication with the terminal C and the terminal D, first, it is necessary to perform frame delivery through multi-hop via the terminal B.

In order to perform such frame delivery through a terminal, it is necessary to confirm that a frame is received from an authenticated valid terminal. This process is called "frame transmission source authentication". Furthermore, if the frame is delivered among terminals, there occurs a risk that the content of the frame is intercepted by the third party in the path thereof. Therefore, there arises a need to maintain secrecy so that transmission and reception of important information and private exchange are not intercepted by the third party. Accordingly, in the embodiment of the present invention, as described in the following, frame transmission source authentication using an authentication header key is performed, and also, an encryption process using a unicast encryption key is performed.

Figure 2:
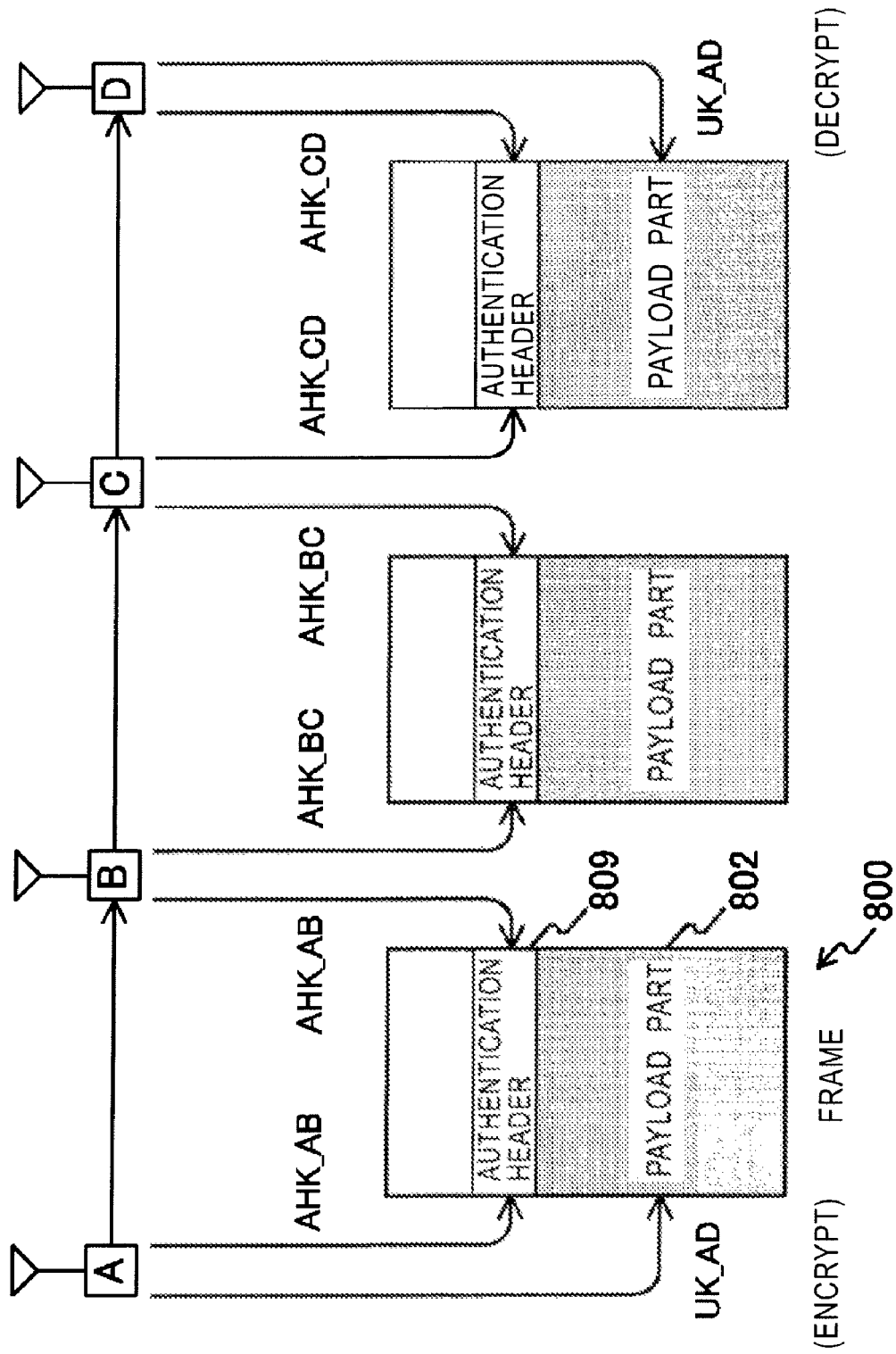
FIG. 2 illustrates the overview of frame transmission source authentication and encryption processes in the embodiment of the present invention.

FIG. 2 illustrates the overview of frame transmission source authentication and encryption processes in the embodiment of the present invention. When a frame in which the terminal D is the end point is to be transmitted, the terminal A, which is the start point of frame transmission, encrypts a payload part 802 of a frame 800 by using a unicast encryption key (UK_AD) with respect to the terminal D. Furthermore, the terminal A generates an authentication header 809 using an authentication header key (AHK_AB) with respect to the terminal B which is the next transmission source and gives the authentication header to the frame 800.

The terminal B receiving the frame confirms whether or not the authentication header 809 is valid by using the authentication header key (AHK_AB) with respect to the terminal A. When it is confirmed that the authentication header 809 is valid, the terminal B generates an authentication header 809 by using an authentication header key (AHK_BC) with respect to the terminal C which is the next transmission source and gives the authentication header to the frame. In that case, the encrypted payload part 802 is transmitted as is. On the other hand, if the authentication header 809 is not valid, the frame is discarded without being delivered to the next transmission source.

In a similar manner, the terminal C receiving the frame confirms whether or not the authentication header 809 is valid by using the authentication header key (AHK_BC) with respect to the terminal B. When it is confirmed that the authentication header 809 is valid, the terminal C generates an authentication header 809 by using an authentication header key (AHK_CD) with respect to the terminal D which is the next transmission source and gives the authentication header to the frame. In that case, the encrypted payload part 802 is transmitted as is. On the other hand, if the authentication header 809 is not valid, the frame is discarded without being delivered to the next transmission source.

The terminal D receiving the frame confirms whether or not the authentication header 809 is valid by using the authentication header key (AHK_CD) with respect to the terminal C. When it is confirmed that the authentication header 809 is valid, the terminal D decrypts the payload part 802 by using the unicast encryption key (UK_AD) with respect to the terminal A. On the other hand, if the authentication header 809 is not valid, the frame is discarded without being decrypted.

Figure 3:
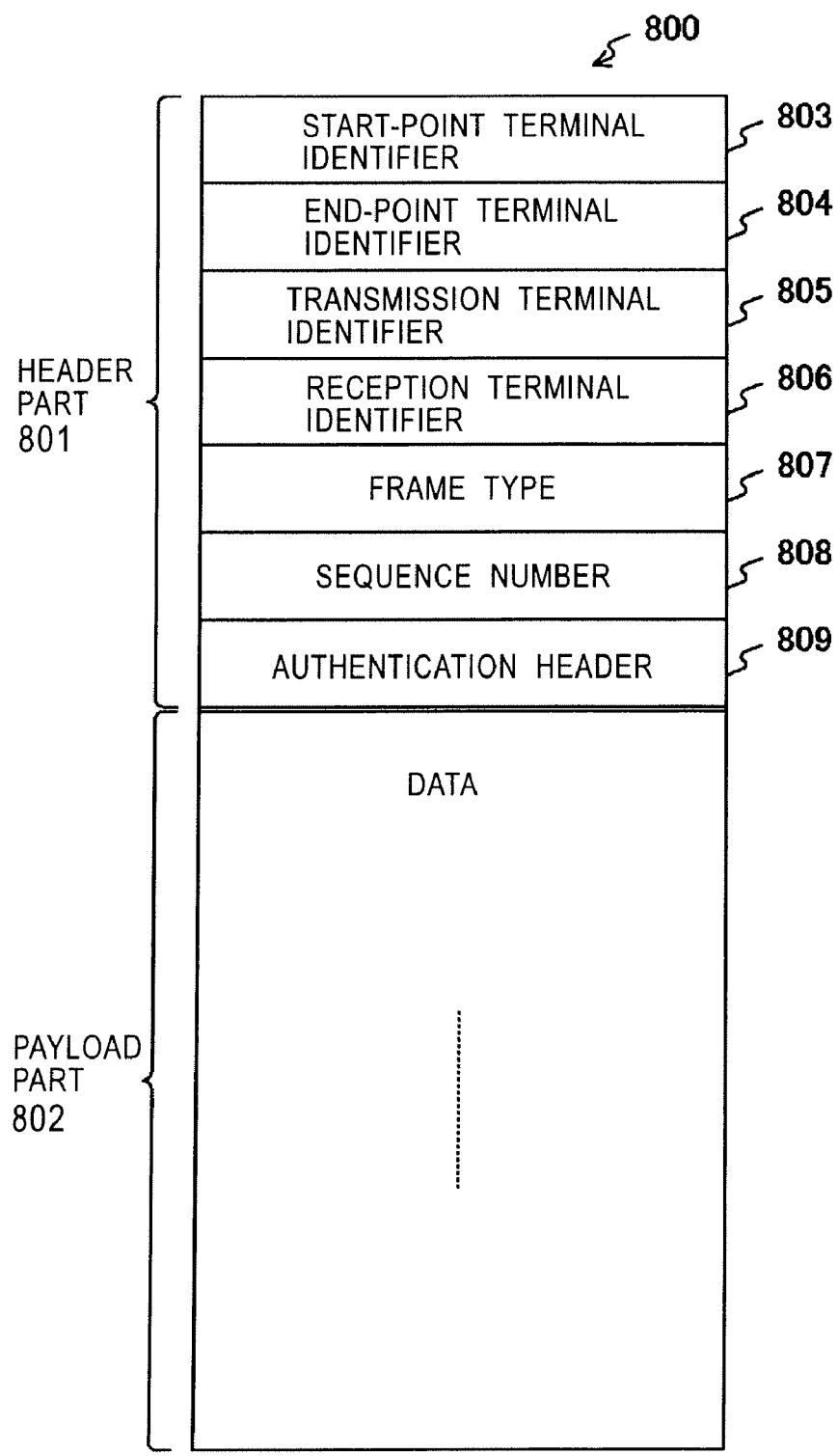
FIG. 3 shows the structure of a frame 800 with an authentication header in the embodiment of the present invention.

FIG. 3 shows the structure of the frame 800 with an authentication header in the embodiment of the present invention. The frame 800 is formed of a header part 801 and a payload part 802. In the payload part 802, data, which is communication content, is stored. This payload part 802 becomes an object for encryption and decryption by the unicast encryption key.

The header part 801 includes a start-point terminal identifier 803, an end-point terminal identifier 804, a transmission terminal identifier 805, a reception terminal identifier 806, a frame type 807, a sequence number 808, and an authentication header 809. The start-point terminal identifier 803 is a terminal identifier of the terminal which has transmitted this frame first. The terminal identifier needs only to uniquely identify the terminal within the network, and, for example, a MAC address in the Ethernet (registered trademark) can be used therefor. The end-point terminal identifier 804 is a terminal identifier of the terminal for the final destination of this frame.

The transmission terminal identifier 805 and the reception terminal identifier 806 are used to relay frames. In the wireless adhoc communication system, it is not always possible to communicate with all the terminals within the network, and when it is desired to transmit a frame to a terminal to which radio waves do not reach, a communication path must be established by multi-hop via another terminal. In this case, it is the transmission terminal identifier 805 and the reception terminal identifier 806 that are used among the terminals which transmit and receive frames. The frame type 807 designates the type of frame. The sequence number 808 is a number which indicates a series of sequences assigned for each frame.

The authentication header 809 is authentication data used to perform frame transmission source authentication. An authentication header key (AHK) is determined in advance between the transmission terminal and the reception terminal. Then, in the transmission terminal, a keyed hashed value, in which a predetermined area of a transmission frame and the authentication header key are hashed together, is generated, and this hashed value is given as the authentication header 809. In the reception terminal, a keyed hashed value, in which a predetermined area of a reception frame and the authentication header key are hashed together, is generated, and this hashed value is compared with the authentication header 809. If the result of this comparison shows a match, it is confirmed that the received frame has been transmitted from the transmission frame.

As a predetermined area of a frame to be hashed, a part of the header part 801 may be used. For example, a combination of the transmission terminal identifier 805 and the sequence number 808 may be used. The combination with the sequence number 808 makes it possible to prevent a so-called replay attack.

Figure 4:
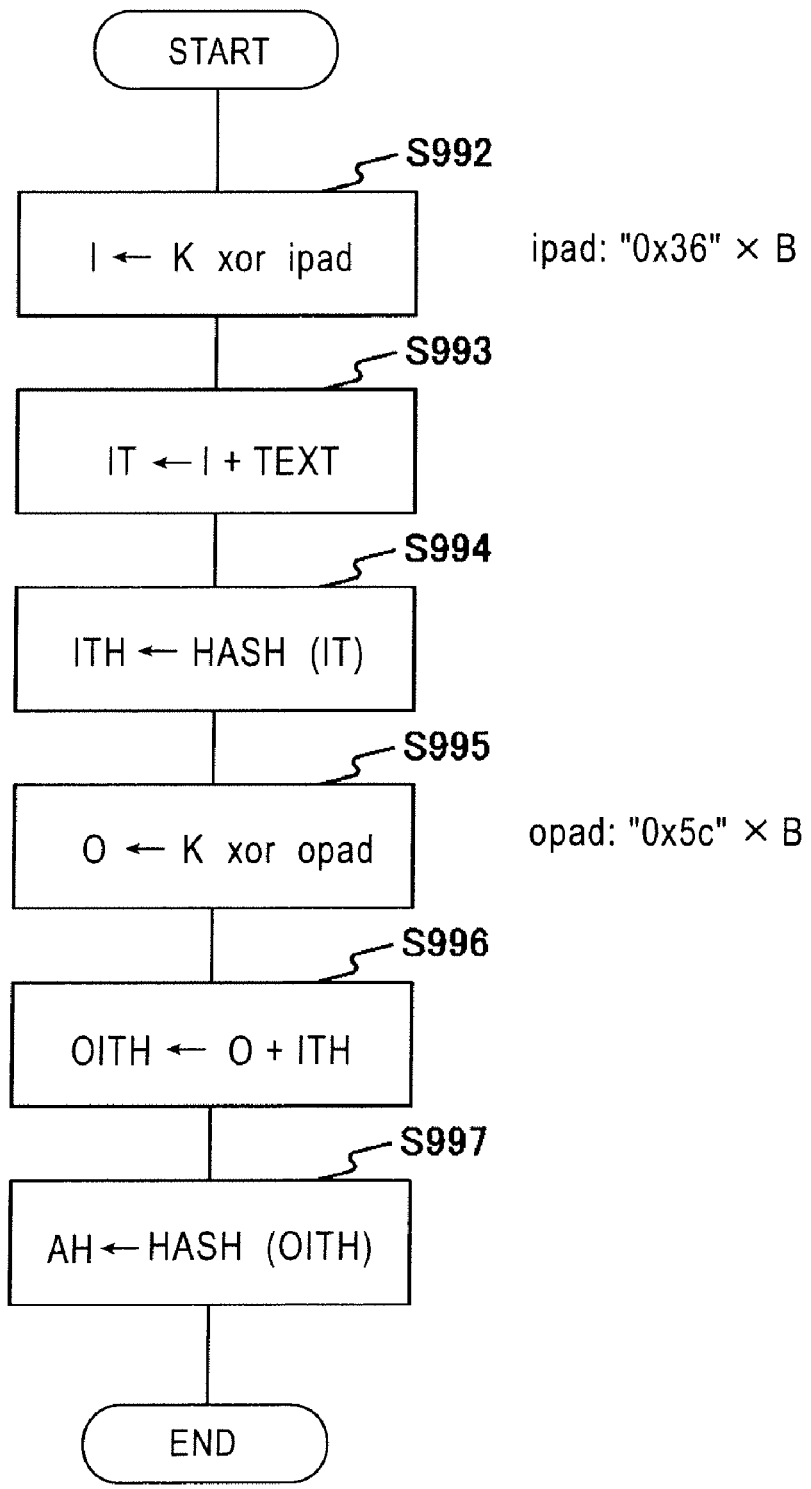
FIG. 4 is a flowchart showing an example of a process for generating an authentication header in the embodiment of the present invention.

FIG. 4 is a flowchart showing an example of a process for generating an authentication header in the embodiment of the present invention. Here, the above-described predetermined area of the frame to be hashed is denoted as "TEXT". Furthermore, for the authentication header key, an authentication header key ZAHK which is normalized so as to have a predetermined length of B bytes (for example, 64 bytes) is used. For example, if the authentication header key is longer than the predetermined B bytes, it must be hashed, and if the authentication header key is shorter than the predetermined B bytes, zeros need to be added. For the hash function used herein, for example, MD5 (Message Digest #5) may be used. This keyed hash function using MD5 is called "HMAC-MD5 (Hash-based Message Authentication Code: Keyed MD5)".

Initially, exclusive OR is generated between the authentication header key ZAHK and a fixed character string ipad (step S992). This generated value is denoted as I. Here, the fixed character string ipad is such that, for example, a byte value 0×36 (bit string '00110110') is repeated for B bytes. Then, as a result of the predetermined area TEXT being added to the generated value I, the value IT is produced (step S993). By applying the hash function to this value IT, a first hashed value ITH is generated (step S994).

Furthermore, exclusive OR is generated between the authentication header key ZAHK and a fixed character string opad (step S995). This generated value is denoted as O. Here, the fixed character string opad is such that, for example, a byte value 0×5c (bit string '01011100') is repeated for B bytes. Then, as a result of the first hashed value ITH being added to this generated value O, the value OITH is produced (step S996). By applying the hash function to this value OITH, an authentication header AH is generated as a second hashed value (step S997).

This procedure of FIG. 4 is used not only when the authentication header is given at the frame transmission terminal, but also when a confirmation is made at the frame reception terminal as to whether or not the authentication header given to the frame is valid. That is, the above-described second hashed value is generated at the frame reception terminal, and if the second hashed value matches the authentication header given to the frame, it is confirmed that the authentication header is valid.

Figure 5:
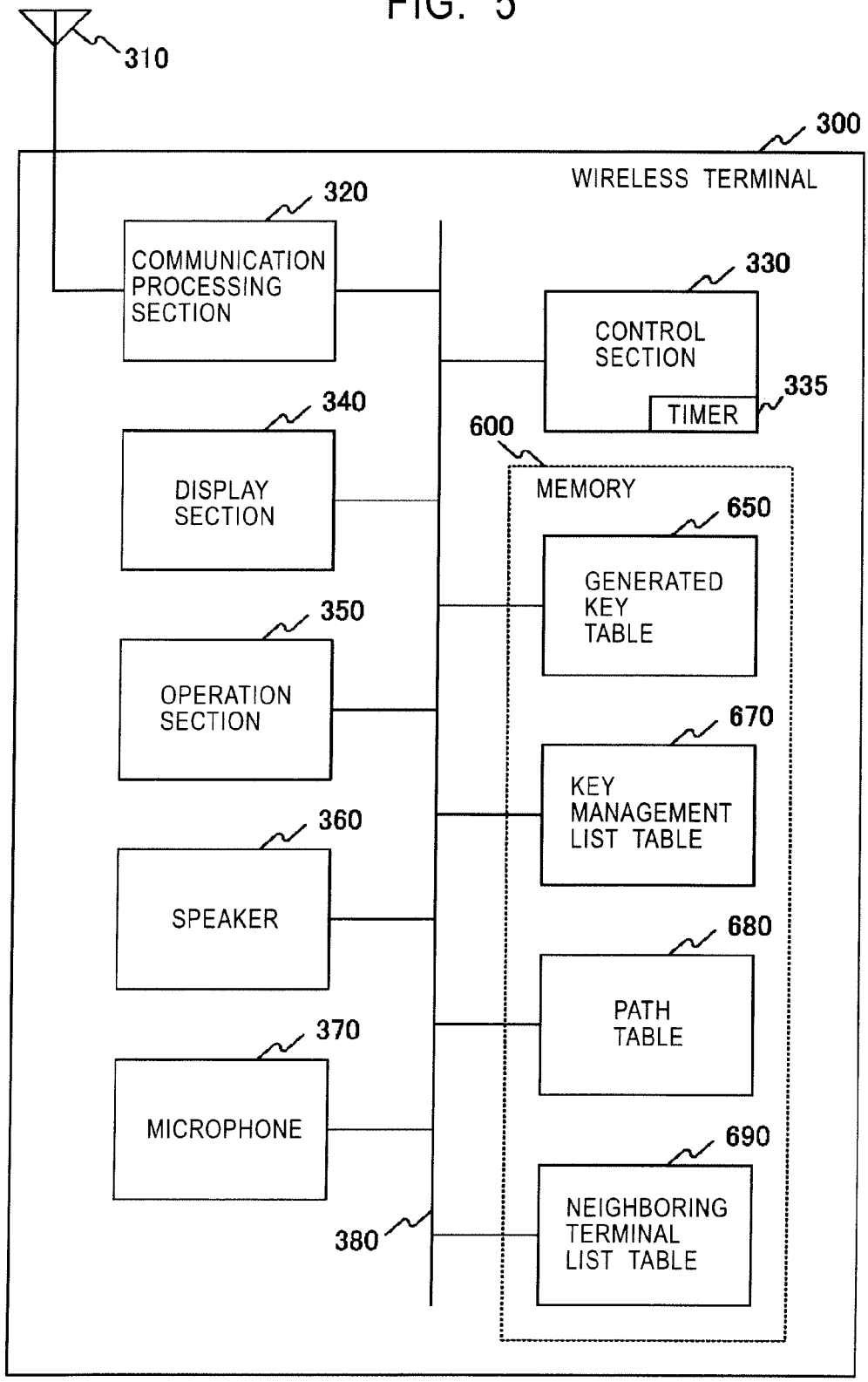
FIG. 5 shows an example of the configuration of a wireless terminal 300 used in the wireless adhoc communication system in the embodiment of the present invention.

FIG. 5 shows an example of the configuration of a wireless terminal 300 used in the wireless adhoc communication system in the embodiment of the present invention. The wireless terminal 300 includes a communication processing section 320, a control section 330, a display section 340, an operation section 350, a speaker 360, a microphone 370, and a memory 600, which are interconnected with one another through a bus 380. Furthermore, an antenna 310 is connected to the communication processing section 320. The communication processing section 320 forms a frame of a network interface layer (data link layer) in accordance with a signal received via the antenna 310. Furthermore, the communication processing section 320 transmits the frame of the network interface layer via the antenna 310.

The control section 330 controls the entire wireless terminal 300. For example, a predetermined process is performed by referring to the frame formed by the communication processing section 320. The control section 330 has a timer 335, so that a time elapsed from a predetermined event is measured. The display section 340 displays predetermined information, and, for example, a liquid-crystal display, etc., can be used therefor. The operation section 350 is used for instructing an external operation with respect to the wireless terminal 300, and, for example, a keyboard, button switches, etc., can be used therefor. The speaker 360 outputs speech, and is used to call attention to the user of the wireless terminal 300 and to exchange audio information with another terminal. The microphone 370 is used to perform external audio input to the wireless terminal 300, to exchange audio information with another terminal, and to instruct an operation.

The memory 600 has stored therein a generated key table 650 for holding the public key, the secret key, and the public key certificate of its own terminal as information regarding the generated key of the wireless terminal 300 itself; a key management list table 670 for holding unicast encryption keys and authentication header keys with respect to other terminals; a path table 680 for holding information regarding a transfer destination terminal for the purpose of causing the frame to arrive at the end-point terminal; and a neighboring terminal list table 690 for holding information regarding terminals with which direct communication is possible among the terminals which form the network.

FIG. 6 shows an example of the structure of the key management list table 670 in the embodiment of the present invention. The key management list table 670 holds unicast encryption keys used for encryption and decryption, and authentication header keys used for generating an authentication header, and has at least one key management list for holding a unicast encryption key 672 and an authentication header key 673 with respect to another terminal in such a manner as to correspond to the terminal identifier 671 of the other terminal.

The terminal identifier 671 uniquely identifies another terminal in the manner described above, and as an example, a MAC address can be used. The unicast encryption key 672 is a common key which is determined for unicast communication with respect to the terminal having the corresponding terminal identifier 671. In order to represent this unicast encryption key 672, for example, the unicast encryption key used between the terminal A and the terminal B is represented as "UK_AB".

As the common key algorithm used for the unicast encryption key, DES (Data Encryption Standard) having a key length of 56 bits, and AES (Advanced Encryption Standard) having three kinds of key lengths of 128, 192, and 256 bits, or the like are known.

The authentication header key 673 is a shared secret key used to generate an authentication header. The authentication header key 673 is hashed together with a predetermined area of the frame, so that duplication of the authentication header by an organization which intends intervene is made impossible. This authentication header 673 should be changed as frequently as possible. This authentication header key 673 is selected randomly, or is generated using a pseudo-random number generator, in which a random seed is given, which provides strong encryption.

FIG. 7 shows an example of the structure of the path table 680 in the embodiment of the present invention. This path table 680 holds information regarding a transfer destination terminal for causing a frame to arrive at the end-point terminal, and has at least one path list for holding the terminal identifier 682 of the transfer destination terminal of the frame and the effective time 683 in such a manner as to correspond to the terminal identifier 681 of the end-point terminal.

The terminal identifier at the end-point terminal identifier 681 and the transfer destination terminal identifier 682 uniquely identifies another terminal in the manner described above. This indicates which terminal the frame should be transferred to next so that the frame is delivered finally to a particular terminal. The case of FIG. 7 assumes an example of the network configuration of FIG. 1, wherein, to whichever terminal the frame is delivered from the terminal A, the frame is transferred to the terminal B at first.

In the wireless adhoc communication system, there is a possibility that the network configuration changes every moment. Therefore, there is a possibility that the information held in the path table 680 becomes old. Accordingly, the freshness of the corresponding information is managed according to the effective time 683. For example, by recording the information updated time or the time elapsed from the information update in the effective time 683, information for which a predetermined time or more has passed may be deleted or updated. The timer 335 of the control section 330 is used to measure these times.

FIG. 8 shows an example of the structure of a neighboring terminal list table 690 in the embodiment of the present invention. This neighboring terminal list table 690 holds information regarding neighboring terminals with which direct communication is possible among the terminals which form the network in the wireless adhoc communication system, and has at least one neighboring terminal list for holding an effective time 692 in such a manner as to correspond to a neighboring terminal identifier 691 of a neighboring terminal.

The neighboring terminal identifier 691 uniquely identifies the neighboring terminal. For example, by assuming that each terminal periodically generates a beacon indicating its own presence, the terminal receiving the beacon is able to know the terminal identifier of the beacon transmission terminal in accordance with the transmission terminal identifier 805 (FIG. 3) contained in that beacon. Accordingly, the beacon reception terminal holds the terminal identifier of the beacon transmission terminal, obtained in this manner, in the neighboring terminal identifier 691 of the neighboring terminal list table 690. In the embodiment of the present invention, the beacon includes not only a signal containing only the beacon information as a beacon signal, but also a signal such that some kind of data information is added to the beacon information.

In the wireless adhoc communication system, there is a possibility that the network configuration changes every moment. There are also cases in which a pre-existing neighboring terminal moves outside the communication range or is disconnected from the network. Accordingly, the authentication status of the corresponding neighboring terminal is managed in accordance with the effective time 692. For example, by recording the beacon received time or the time elapsed from the reception of the beacon in the effective time 692, the neighboring terminal in which a predetermined time or more has elapsed may be considered to have been disconnected from the network. The timer 335 of the control section 330 is used to measure the time elapsed from the reception of the beacon.

A description will now be given, with reference to the drawings, of the operation of the wireless adhoc communication system in the embodiment of the present invention. In the embodiment of the present invention, it is assumed that, when a terminal is to be connected to the network resources, mutual authentication is performed among the devices. Then, an authentication header key (FIG. 9) and a unicast encryption key (FIG. 10) are shared in accordance with the key distribution sequence described below following the mutual authentication. The processes in FIGS. 9 and 10 are realized by the control section 330 in the wireless terminal 300.

Figure 9:
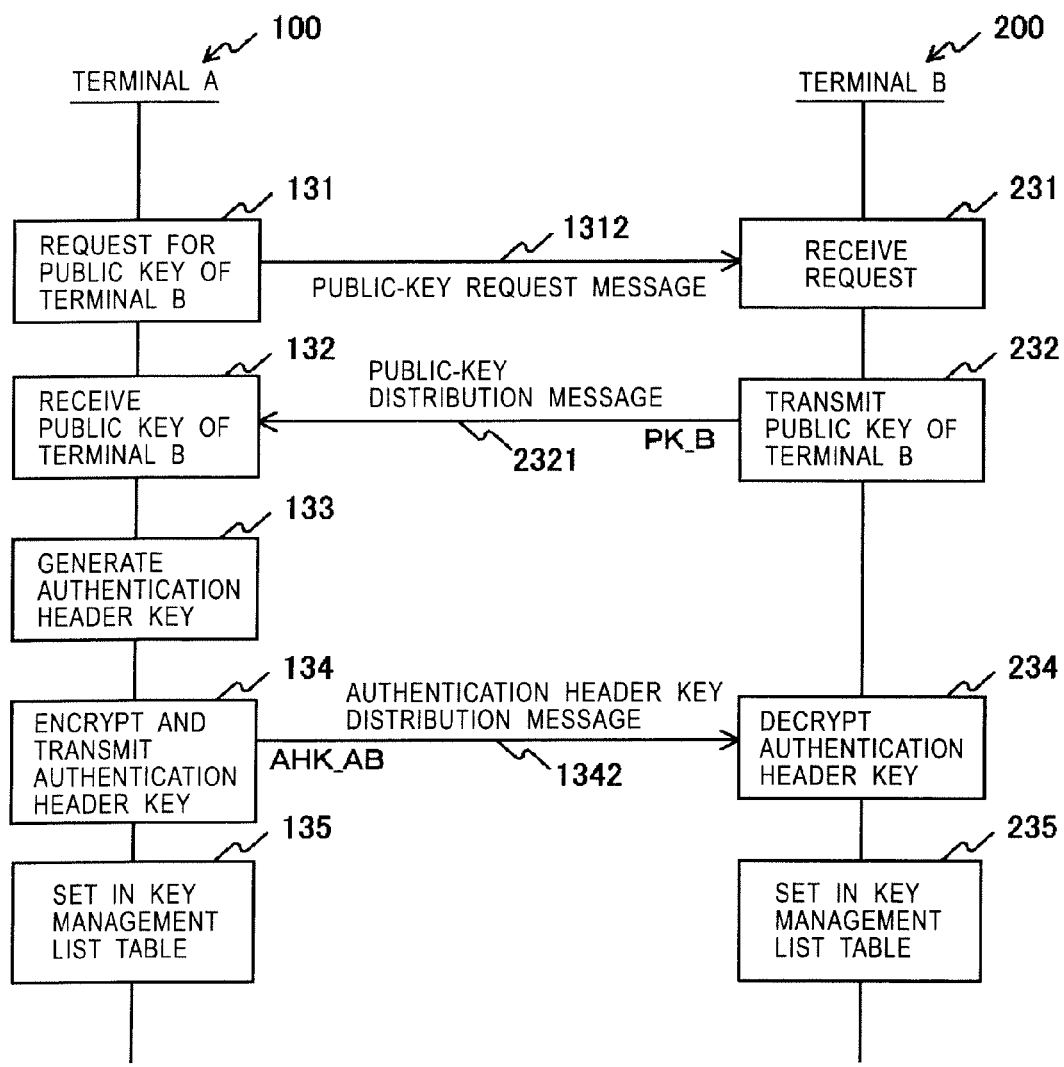
FIG. 9 shows an authentication header key distribution procedure in the embodiment of the present invention.
Figure 10:
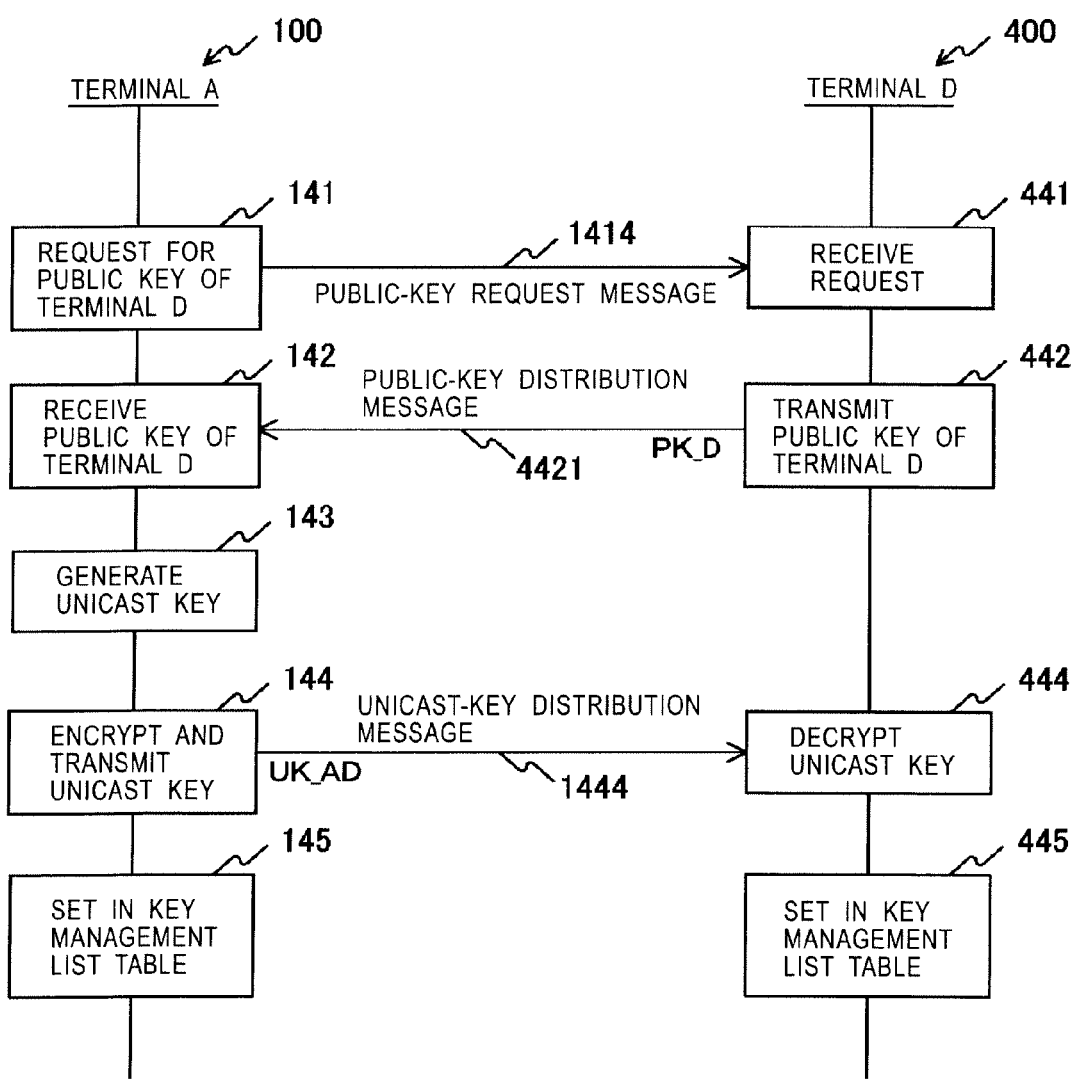
FIG. 10 shows a unicast encryption key distribution procedure in the embodiment of the present invention.

FIG. 9 shows an authentication header key distribution procedure in the embodiment of the present invention. In the example of FIG. 9, although the terminal A among the terminal A (100) and the terminal B (200) generates an authentication header key, either terminal may generate this key. For example, the terminal used to generate this key may be determined according to the size of the terminal identifier.

Initially, the terminal A determines whether or not a public key which is necessary for distributing the authentication header key is held. If the public key of the terminal B is not possessed, a public key request message 1312 for requesting the public key is transmitted to the terminal B (131). For the public key request message 1312, the frame of the structure described with reference to FIG. 3 can be used; however, at this point in time, the authentication header cannot be given yet.

The terminal B receiving the public key request message 1312 transmits the public key (PK_B) of the terminal B, held in the generated key table 650 (FIG. 5), to the terminal A in accordance with a public key distribution message 2321 (232). Also, for this public key distribution message 2321, the frame structure described with reference to FIG. 3 can be used. The terminal A receiving the public key distribution message 2321 extracts the public key (PK_B) of the terminal B.

Furthermore, the terminal A generates the authentication header key (AHK_AB) (133). The authentication header key is generated randomly or on the basis of a random number in the manner described above. This authentication header key should be changed as appropriate. The terminal A encrypts the generated authentication header key (AHK_AB) in accordance with the public key (PK_B) of the terminal B, and transmits it as an authentication header key distribution message 1342 to the terminal B (134). The terminal B receiving the authentication header key distribution message 1342 decrypts the authentication header key in accordance with the secret key of the terminal B itself (234).

The terminal A and the terminal B set the authentication header key (AHK_AB) obtained in this manner in the key management list table 670 (FIG. 6) of its own terminal (135, 235). That is, the terminal A sets the authentication header key (AHK_AB) in the column of the authentication header key 673 of the key management list having the terminal B as the terminal identifier 671. The terminal B sets the authentication header key (AHK_AB) in the column of the authentication header key 673 of the key management list having the terminal A as the terminal identifier 671. In this manner, the terminals which form the wireless adhoc communication system share the authentication header key with respect to the adjacent terminal.

FIG. 10 shows a unicast encryption key distribution procedure in the embodiment of the present invention. This unicast encryption key may be distributed in advance, and may also be distributed when communication is performed in practice. In the example of FIG. 10, although the terminal A among the terminal A (100) and the terminal D (400) generates a unicast encryption key, either terminal may generate this key. For example, the terminal used to generate this key may be determined according to the size of the terminal identifier.

Initially, the terminal A determines whether or not a public key which is necessary for distributing the unicast header key is held. If the public key of the terminal D is not possessed, a public key request message 1414 for requesting the public key is transmitted to the terminal D (141). For the public key request message 1414, the frame of the structure described with reference to FIG. 3 can be used.

The terminal D receiving the public key request message 1414 transmits a public key (PK_D) of the terminal D, held in the generated key table 650 (FIG. 5), to the terminal A in accordance with a public key distribution message 4421 (442). Also, for this public key distribution message 4421, the frame structure described with reference to FIG. 3 can be used. The terminal A receiving the public key distribution message 4421 extracts the public key (PK_D) of the terminal D.

Furthermore, the terminal A generates a unicast encryption key (UK_AD). The unicast encryption key is generated randomly or on the basis of a random number. The terminal A encrypts the generated unicast encryption key (UK_AD) in accordance with the public key (PK_D) of the terminal D, and transmits it as a unicast encryption key distribution message 1444 to the terminal D (144). The terminal D receiving the unicast encryption key distribution message 1444 decrypts the unicast encryption key by using the secret key of the terminal D itself (444).

The terminal A and the terminal D set the unicast encryption key (UK_AD) which is obtained in this manner in the key management list table 670 (FIG. 6) of its own terminal (145, 245). That is, the terminal A sets the unicast encryption key (UK_AD) in the column of the unicast encryption key 672 of the key management list having the terminal D as the terminal identifier 671, and the terminal D sets the unicast encryption key (UK_AD) in the column of the unicast encryption key 672 of the key management list having the terminal A as the terminal identifier 671.

Next, the frame transmission and reception processes in each terminal of the wireless adhoc communication system in the embodiment of the present invention will be described below with reference to the drawings.

Figure 11:
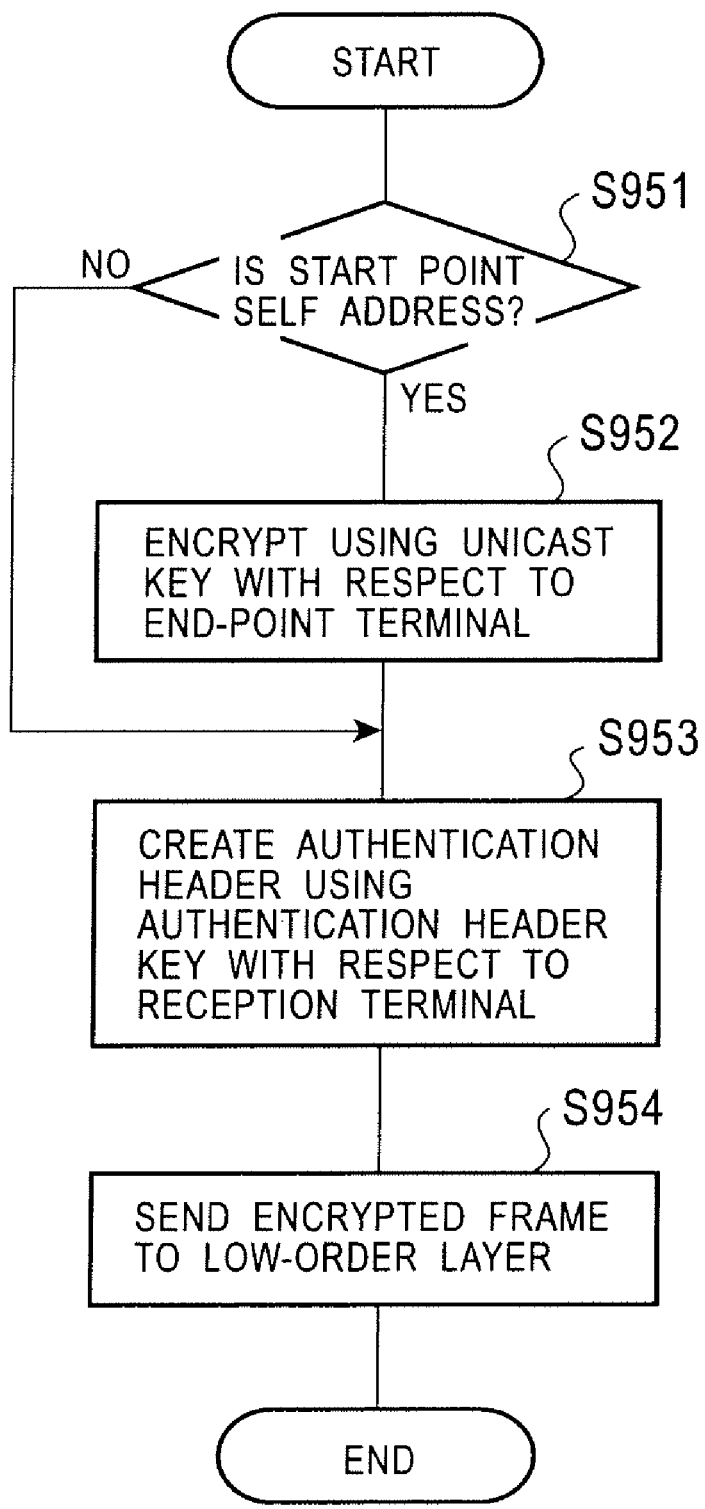
FIG. 11 shows a process during frame transmission in the embodiment of the present invention.

FIG. 11 shows a process during frame transmission in the embodiment of the present invention. When a frame, whose origin is its own terminal, is to be transmitted, since the start-point terminal identifier 803 becomes the terminal identifier of its own terminal (step S951), the payload part 802 is encrypted in accordance with the unicast encryption key which is determined with respect to the end-point terminal (step S952). This unicast encryption key is obtained by extracting from the key management list table 670 of FIG. 6 the unicast encryption key 672 corresponding to the terminal identifier 671 matching the end-point terminal identifier 804. When a frame from another terminal is to be relayed, since the start-point terminal identifier 803 differs from the terminal identifier of its own terminal, no processing is performed on the payload part 802 (step S951).

Then, an authentication header is generated in accordance with the authentication header key with respect to the reception terminal, and the authentication header is given to the authentication header 809 (FIG. 3) of the frame 800 (step S953). This authentication header key is obtained by extracting from the key management list table 670 of FIG. 6 the authentication header key 673 corresponding to the terminal identifier 671 matching the reception terminal identifier 806 (FIG. 3). Thereafter, the frame in which the authentication header is given is sent to the low-order layer (step S954).

Figure 12:
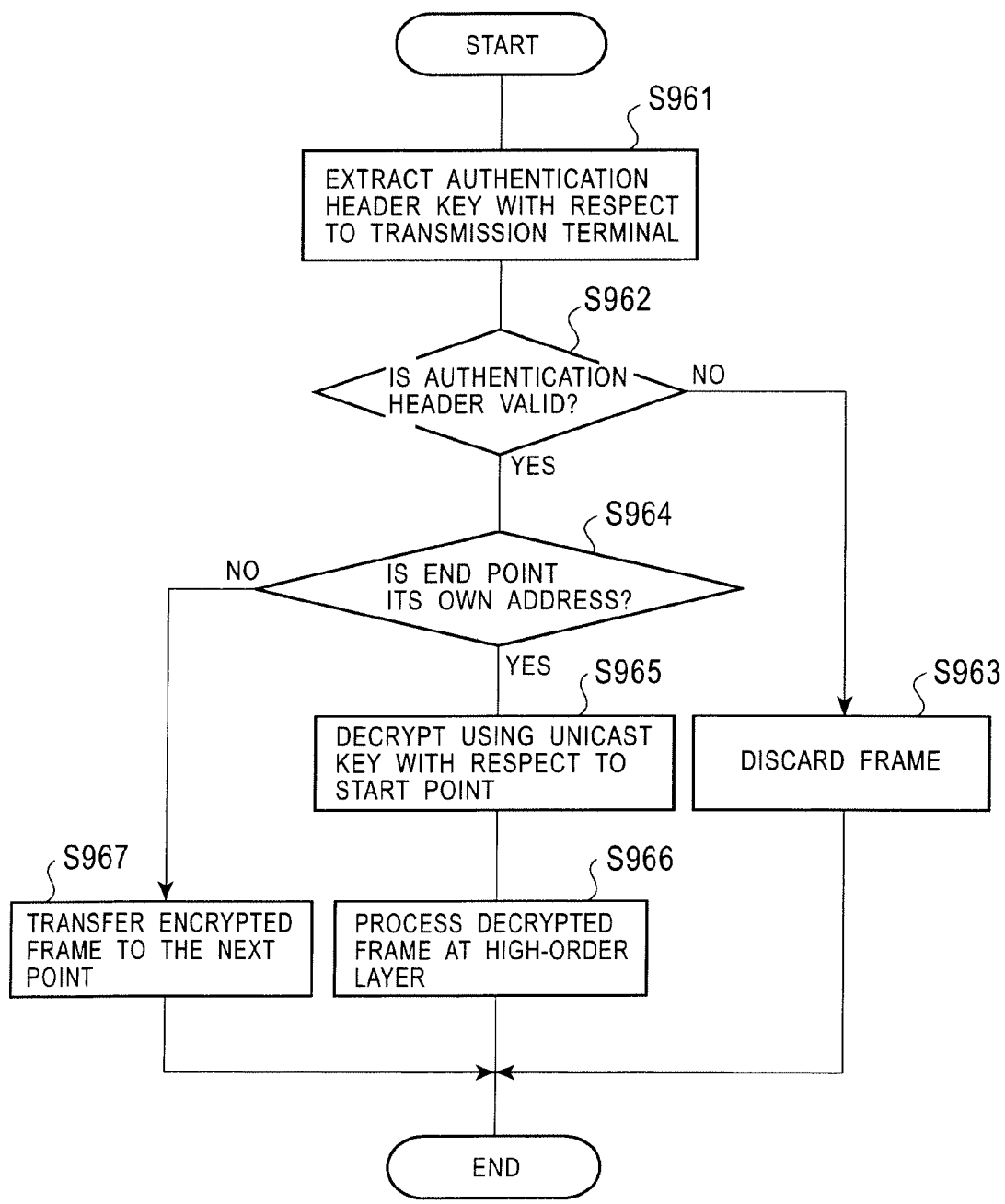
FIG. 12 shows a process during frame reception in the embodiment of the present invention.

FIG. 12 shows a process during frame reception in the embodiment of the present invention. The terminal receiving a frame with an authentication header extracts an authentication header key with respect to the transmission terminal (step S961), and confirms whether or not the authentication header 809 given to the frame is valid by using the authentication header key (step S962). This authentication header key is obtained by extracting from the key management list table 670 of FIG. 6 the authentication header key 673 corresponding to the terminal identifier 671 matching the transmission terminal identifier 805 (FIG. 3). If the authentication header is not valid (step S962), that frame is discarded (step S963).

If the authentication header is valid (step S962) and the end-point terminal identifier is the terminal identifier of its own terminal (step S964), the unicast encryption key 672 corresponding to the terminal identifier 671 matching the start-point terminal identifier 803 (FIG. 3) is extracted from the key management list table 670 of FIG. 6, and the payload part 802 is decrypted using the unicast encryption key (step S965). The decrypted frame is processed at the high-order layer (step S966).

On the other hand, if the authentication header is valid (step S962) and the end-point terminal identifier is not the terminal identifier of its own terminal (step S964), the frame is transferred to the terminal of the next point (step S967). The terminal of the next point can be known by extracting from the path table 680 (FIG. 7) the end-point terminal identifier 681 matching the end-point terminal identifier 804 (FIG. 4) of the frame 800 and by referring to the corresponding transfer destination terminal identifier 682.

A description will now be given of a process when a terminal is disconnected from the network of the wireless adhoc communication system in the embodiment of the present invention.

Terminals perform communication with other terminals having a terminal identifier held in the neighboring terminal list table 690, forming the network of the wireless adhoc communication system. Examples of cases in which a particular terminal is disconnected from the network include a case in which the terminal leaves from the network by explicitly declaring a disconnection, and a case in which the terminal implicitly leaves from the network due to the physical position of the terminal being moved or the time-out of communication because the power supply is cut off.

The case where the terminal is explicitly disconnected can occur, for example, as a result of the terminal that intends to be disconnected transmitting a disconnection request message to a neighboring terminal. The frame structure of this disconnection request message is the same as that of FIG. 3, and appropriate authentication header and encryption processes are performed. Therefore, it is not possible for a malicious terminal, which is an impersonation, to transmit a disconnection request message. The terminal receiving the disconnection request message sends back a disconnection response message to the transmission source terminal. As a result, the terminal is explicitly disconnected.

The case where the terminal is implicitly disconnected can occur, for example, as a result of the presence of a particular terminal not being capable of being confirmed by the neighboring terminal. Each terminal periodically transmits a beacon, and when a beacon from the neighboring terminal is received, the neighboring terminal list table 690 is updated. For example, when the physical distance to the neighboring terminal is increased due to the movement of the terminal and the terminal goes out of the range in which the radio waves reach (communication range), or when the communication with another terminal cannot be performed due to a sporadic power down such as battery shortage, the beacon cannot be received, and the update of the neighboring terminal list table 690 is not performed. For the neighboring terminal in which the update of the neighboring terminal list table 690 is not performed for a predetermined time or more, the authentication relationship is reset, placing the neighboring terminal in the non-authenticated state. As a result, the terminal is implicitly disconnected.

Figure 13:
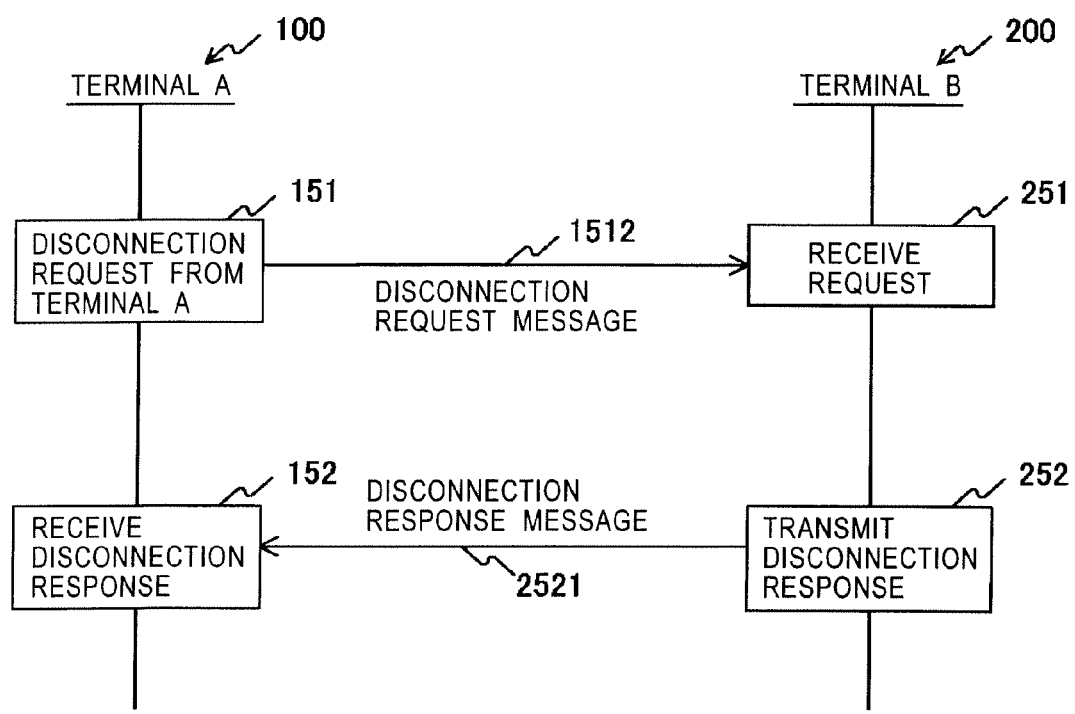
FIG. 13 shows a procedure when a terminal is explicitly disconnected.

FIG. 13 shows a procedure when a terminal is explicitly disconnected. When the terminal A is to be disconnected from the network, the terminal A transmits a disconnection request message 1512 (151). The frame structure of the disconnection request message 1512 is as shown in FIG. 3, and the terminal B, which is a neighboring terminal, is assumed to be the reception terminal identifier 806 and the end-point terminal identifier 804. When the disconnection request message 1512 is received (251), the terminal B transmits a disconnection response message 2521 to the terminal A (252). The disconnection response message 2521 is also as shown in FIG. 3, and the terminal A is assumed to be the reception terminal identifier 806 and the end-point terminal identifier 804. The terminal A confirms that the disconnection request has been received by receiving the disconnection response message 2521 (152).

Figure 14:
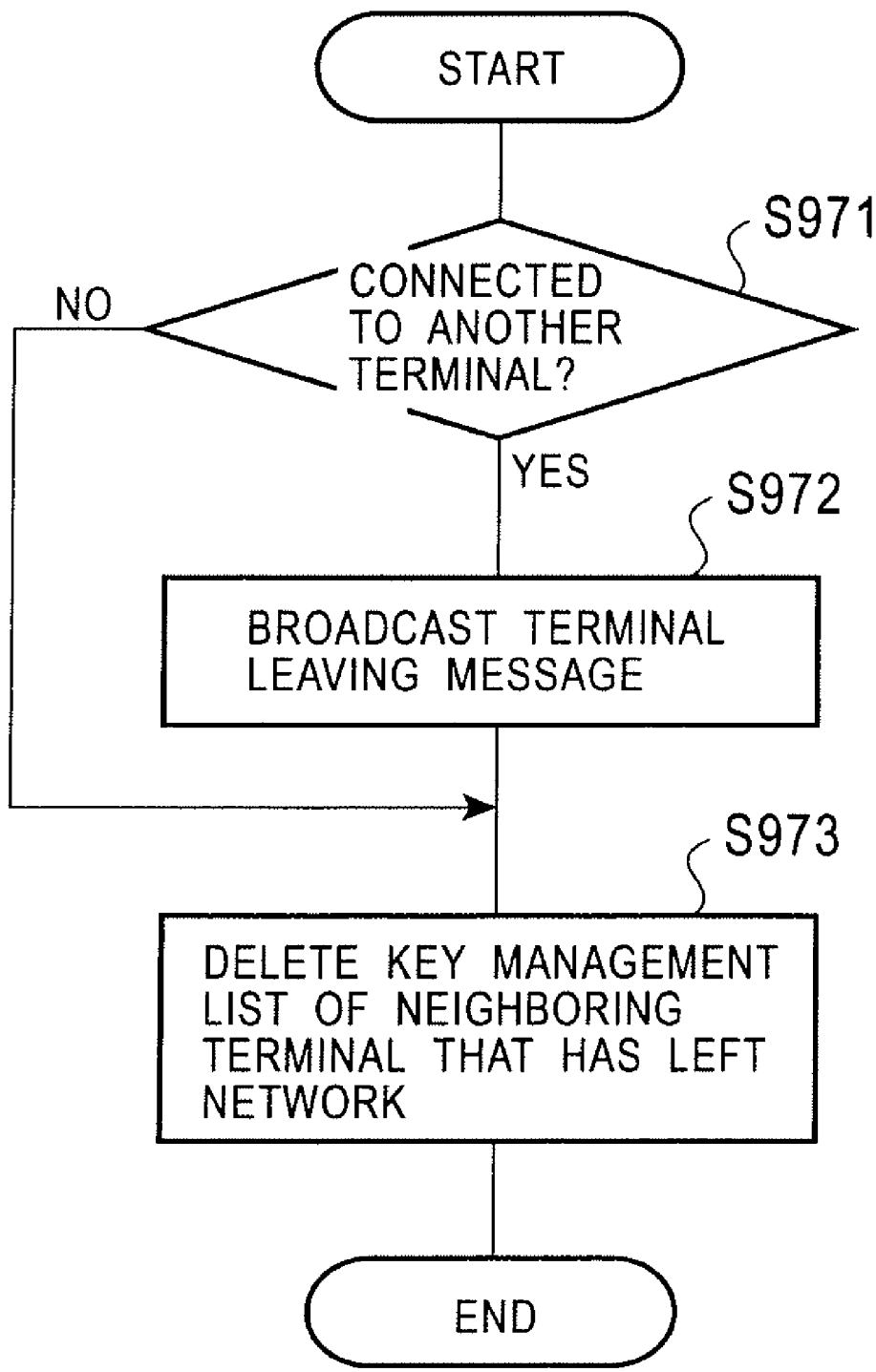
FIG. 14 shows an operation to be performed by a terminal which has received a disconnection request message or by a terminal which has detected an implicit disconnection in the embodiment of the present invention.

FIG. 14 shows an operation to be performed by a terminal which has received a disconnection request message or by a terminal which has detected an implicit disconnection. When the disconnection request message or an implicit disconnection is detected, if a terminal other than the disconnected terminal exists by referring to the neighboring terminal list table 690 (step S971), a terminal leaving message is broadcast (step S972). The frame structure of this terminal leaving message is as shown in FIG. 3, the terminal identifier of the neighboring terminal is set in the reception terminal identifier 806, and the broadcast address is set in the end-point terminal identifier 804. Furthermore, the terminal identifier of the terminal which leaves from the network is contained in the payload part 802.

Then, the key management list having the terminal identifier of the disconnected terminal in the terminal identifier 671 of the key management list table 670 is extracted, and the corresponding key management list is deleted (step S973). As a result, the authentication header cannot be exchanged with respect to the corresponding terminal, and the encrypted frame cannot be exchanged. Therefore, even if the terminal which is disconnected once intends to be connected again, the terminal cannot be connected in the state as is.

Figure 15:
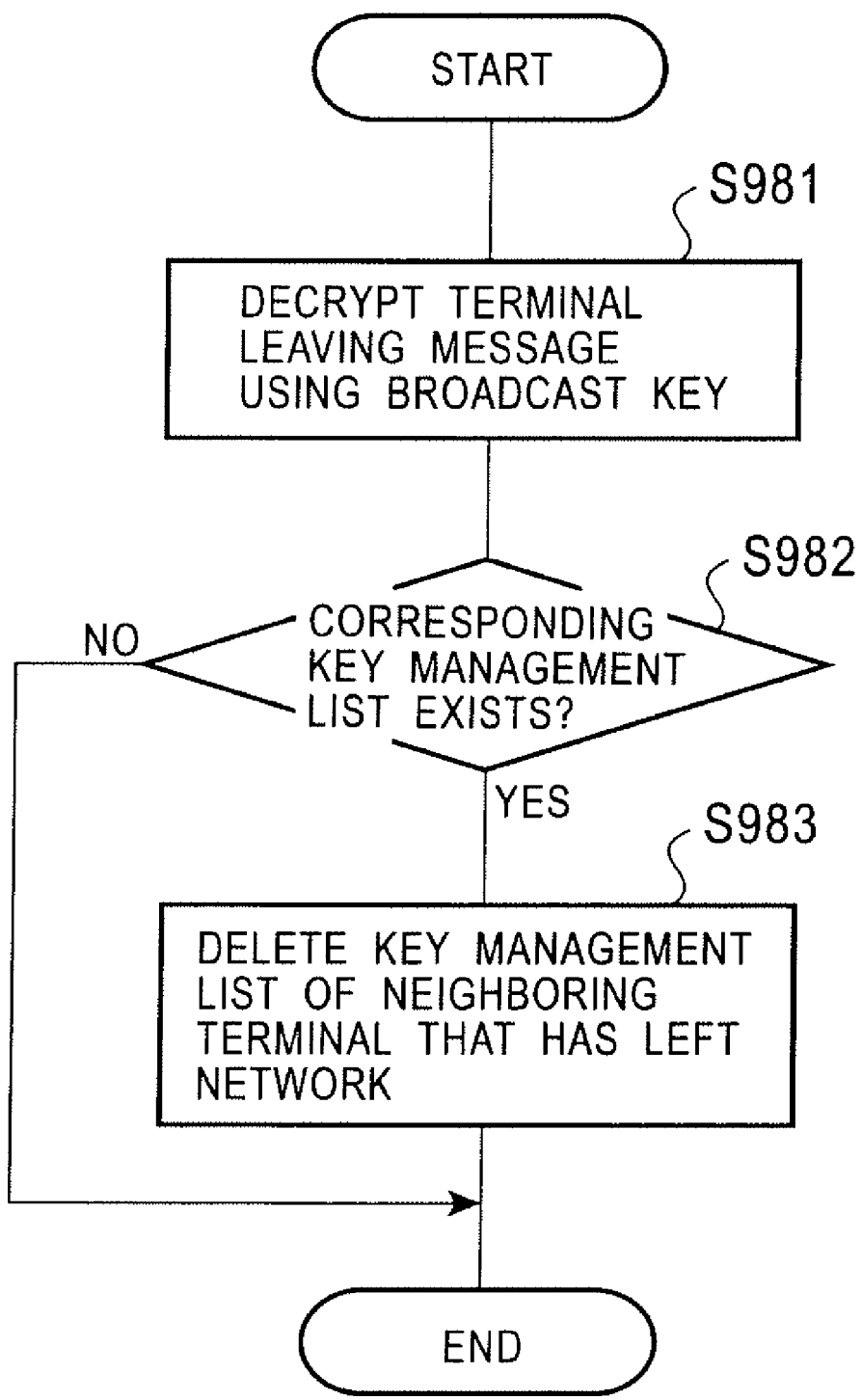
FIG. 15 shows an operation to be performed by a terminal which has received a disconnection/leaving message in the embodiment of the present invention.

FIG. 15 shows an operation to be performed by a terminal which has received a disconnection/leaving message. When a disconnection/leaving message is received, the disconnection/leaving message is decrypted using the broadcast encryption key which is held in advance (step S981), and the terminal identifier of the terminal which leaves from the network is extracted from the payload part 802. Then, the key management list having the terminal identifier of the disconnected terminal in the terminal identifier 671 of the key management list table 670 is extracted (step S982), and the corresponding key management list is deleted (step S983). As a result, the disconnected terminal cannot exchange the authentication header with respect to any terminal on the network, and also cannot exchange the encrypted frame. Therefore, even if the terminal which is disconnected once intends to be connected again, the connection cannot be accepted in the state as is.

As described above, according to the embodiment of the present invention, the authentication header 809 generated using the authentication header key is given in advance to the header part 801 of the frame 800 at the transmission terminal, and the validity of the authentication header 809 is confirmed using the authentication header key at the reception terminal, thus making it possible to confirm that the frame 800 has been transmitted from the authenticated valid terminal. Furthermore, this makes it possible to avoid unwanted communication and to prevent wasted consumption of wireless resources.

The processing procedures described herein may be considered to be a method including these series of procedures, may be considered to be a program for enabling a computer (terminal) to execute these series of procedures, or may be considered to be a recording medium for storing the program.

What is claimed is:

1. A multi-hop wireless adhoc communication system formed of at least three wireless terminals, said multi-hop wireless adhoc communication system comprising:

a first wireless terminal for transmitting to a second wireless terminal via a third wireless terminal a frame having an authentication header and a payload, the authentication header having a first encryption and the payload having a second encryption different from the first encryption, said first wireless terminal generating said authentication header by using a first authentication header key corresponding to the first encryption which is known to the third wireless terminal and the second encryption generated using a second encryption key which is not known to the third wireless terminal but is known by the second wireless terminal; and a third wireless terminal for receiving said frame and sending the frame to the second wireless terminal after confirming that said authentication header is valid by selecting and using said first authentication header key corresponding to the first encryption, the third wireless terminal selecting said first authentication header key based on information in a transmission terminal identifier of the frame that indicates that the frame is received from the first wireless device.

2. A multi-hop wireless adhoc communication system formed of at least three wireless terminals, said multi-hop wireless adhoc communication system comprising:

a first wireless terminal for encrypting the payload of a first frame and transmitting the first frame in which a first authentication header is given;

a second wireless terminal for receiving said first frame and transmitting a second frame containing said encrypted payload, in which a second authentication header is given when it is confirmed that said first authentication header is valid; and a third wireless terminal for receiving said second frame and decrypting said encrypted payload when it is confirmed that said second authentication header is valid, wherein said first wireless terminal encrypts said payload by using a first encryption key corresponding to said third wireless terminal, and generates said first authentication header by using a first authentication header key corresponding to said second wireless terminal, said second wireless terminal confirms that said first authentication header is valid by selecting and using said first authentication header key and generates said second authentication header by using a second authentication header key corresponding to said third wireless terminal, and said third wireless terminal confirms that said second authentication header is valid by selecting and using said second authentication header key and decrypts said payload by using said first encryption key corresponding to said first wireless terminal, wherein the second wireless terminal selects said first authentication header key based on information in a transmission terminal identifier of the first frame that indicates that the first frame is received from the first wireless device.

3. A multi-hop wireless adhoc communication system formed of at least three wireless terminals, said multi-hop wireless adhoc communication system comprising:

a first wireless means for encrypting the payload of a first frame and for transmitting the first frame in which a first authentication means is given;

a second wireless means for receiving said first frame and for transmitting a second frame containing said encrypted payload, in which a second authentication means is given when it is confirmed that said first authentication means is valid; and a third wireless means for receiving said second frame and for decrypting said encrypted payload when it is confirmed that said second authentication means is valid, wherein said first wireless means encrypts said payload by using a first encryption key means corresponding to said third wireless means, and generates said first authentication means by using a first authentication key means corresponding to said second wireless means, said second wireless means confirms that said first authentication means is valid by selecting and using said first authentication key means and generates said second authentication means by using a second authentication key means corresponding to said third wireless means, and said third wireless means confirms that said second authentication means is valid by selecting and using said second authentication key means and decrypts said payload by using said encryption key means corresponding to said first wireless means, wherein the second wireless means selects said first authentication key means based on information in a transmission terminal identifier of the first frame that indicates that the first frame is received from the first wireless means.

* * * * *